Dec. 6, 1966   T. PRIMICH ET AL   3,290,066
SHEET METAL PIPE FITTING
Filed Sept. 12, 1963
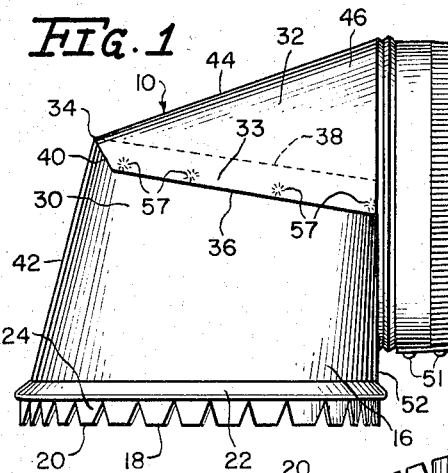
FIG. 1
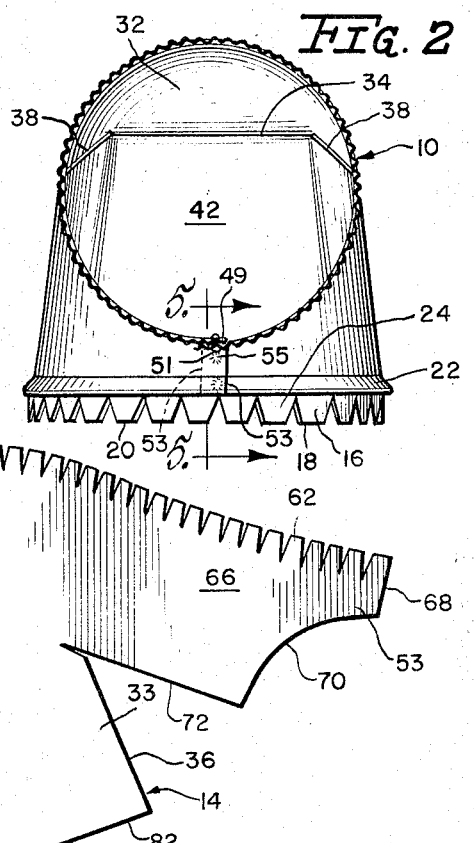
FIG. 2
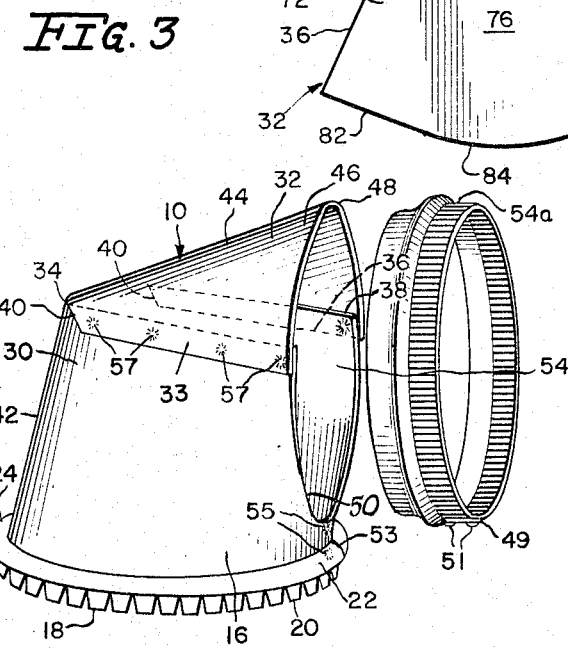
FIG. 3
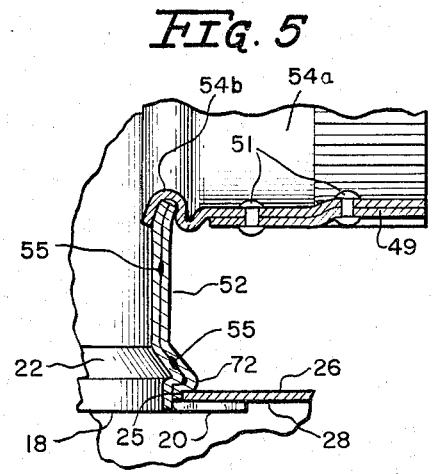
FIG. 5
FIG. 4
INVENTORS
Theodore Primich
Howard R. Nichols
By Stone, Nieman,
Burmeister and Zimmer
Attys.

United States Patent Office 3,290,066
Patented Dec. 6, 1966

3,290,066
SHEET METAL PIPE FITTING
Theodore Primich and Howard R. Nichols, Gary, Ind., assignors to Gary Steel Products Corp., Gary, Ind., a corporation of Indiana
Filed Sept. 12, 1963, Ser. No. 308,403
14 Claims. (Cl. 285—183)

This invention relates to sheet metal fittings of the type used in heating, ventilating, and air conditioning and similar systems and particularly to elbow fittings, specifically elbow fittings of the general type frequently called "takeoffs," used to connect branch lines in such a system to a plenum or main duct.

A variety of types of takeoffs are in common use for various specific purposes, both of the straight (designed for perpendicular connections between the wall of the plenum and the branch line) and of various angular configurations. Generally, all such takeoffs have a mouth portion adapted to be installed in and on the wall of the main duct. The latter is, in modern installations normally of rectangular cross-section, the takeoff thus being designed to mount in and on a suitably cut aperture in the flat side of the plenum. Depending upon the particular application, the branch line may be of a variety of constructions and sizes, rectangular, square, or round. Such takeoffs are normally characterized, therefore, by the shape and size of the hole in the plenum to which the inlet end of the takeoff must be matched and the size of the branch line to be joined to the plenum by the takeoff. Because of considerations of pressure drops, etc., in addition to matters of economy, the design of such systems very frequently uses an inlet mouth of different size and/or shape than the outlet branch line connection. Such a fitting is accordingly characterized as "rectangular-to-round," "round-to-round," etc., with dimensions of inlet and outlet specified.

Because of the simple construction of round pipe suitable for branch lines and the simplicity of cutting of round holes in the sheet material of plenum duct, round-to-round takeoffs are advantageous in many applications. However, round-to-round takeoffs heretofore in common use have serious limitations in numerous applications, particularly in the case of elbow takeoffs of smaller outlet (branch) size than inlet (plenum connection) size. (It will of course be understood that the term "elbow" is not used herein in the sense negating dimensional change between inlet and outlet, as sometimes implied in trade parlance.) In many applications, it is desirable to use an elbow takeoff to connect a branch running between joists to the top of a plenum duct; such a takeoff application requires a minimum of "head room" for utility. The round-to-round constructions of such elbow fittings heretofore available have been in general subject either to the objection of high cost or to the objection of excessive pressure drop, in achieving performance fully comparable with that of other forms of takeoff connections while at the same time achieving the head room compactness required for practicality.

It is the principal object of the present invention to provide a construction for a round-to-round elbow takeoff which combines low cost of fabrication, small pressure drop (i.e. flow resistance) and small "head room" contour, thus providing a construction for such a takeoff which is capable of more widespread use than constructions heretofore available.

It is of course well known that various types of sheet metal fittings are advantageously formed from a single pre-formed flat blank, and attempts have heretofore been made to devise one-piece elbow constructions for sheet metal pipe and fittings. None of these has proved fully suitable for adaptation to the present object. However, as will hereafter be seen, the structure of the round-to-round takeoff to be described herein incorporates basic novel principles which may be advantageously adapted to other types of sheet metal fittings than the round-to-round reducing elbow takeoff illustrated and described. These constructional features, and the manner in which they achieve the objects and advantages above mentioned, together with the manner of adapting the teachings of the invention in its broader aspects to other types of elbow fittings will be readily understood from the description of the embodiment of the invention illustrated in the drawing and described below.

In the drawing:
FIGURE 1 is a view in side elevation of a takeoff embodying the invention;
FIGURE 2 is a view in front elevation thereof;
FIGURE 3 is an elevational view of a blank or form comprising a unitary piece of sheet material from which the body of the takeoff is formed;
FIGURE 4 is an isometric view of the illustrated embodiment with the coupling collar thereof detached from the body; and
FIGURE 5 is an enlarged fragmentary view in section taken along line 5—5 of FIGURE 2, but showing the takeoff as installed on a duct.

For convenience of reference, in the description of the takeoff illustrated, certain of the parts or portions will be designated or identified as "lower," "rearward," etc., with reference to the orientation shown in the drawing, considering the right-hand direction in FIGURE 1 as the "forward" direction.

The embodiment shown in the drawing is an air takeoff duct 10 having its body formed from a single piece of sheet metal cut as a blank 14 and comprising a lower generaly round entrant portion 16 provided with a circular edge 18 having tabs 20 depending from a roll-formed seating and sealing bead 22 and defining a base zone 24 adapted to rest upon and within a round opening 25 of a duct (FIGURE 5); as is conventional, the tabs 20 are, in the installed condition of FIGURE 5, bent up against the inner surface 28 of the duct.

The upper part 30 of the lower entrant portion 16 is connected to the upper exit portion 32 at the rearward corner or juncture 34. The upper portion 32 has a pair of downwardly extending flaps 33 having edges 36 exteriorly overlapping upper edges 38 of the lower portion 16, the rearwardly extending edges 36 being terminated by bevel or diagonal edges 40 at juncture 34. The rear line or crest 42 of the lower portion 16 forms an obtuse angle with the upper line or crest 44 of the upper portion 32 as seen in FIGURE 1, both extending upwardly and forwardly, but the former extending primarily upwardly while the latter extends primarily forwardly. The end portion 46 of the upper body portion 32 has a forward edge 48 semicircular in front elevation cooperating with a lower semicircular edge 50 formed on the front surface 52 of the lower portion 16 to produce an overall circular exit 54 from the body of the takeoff. The lower part of the front 52 is formed of overlapped ends 53 of the unitary blank from which the body is formed, secured by spot welding at 55. The flaps 33 are spot-welded (or similarly secured) at 57 to the upper end of the lower portion 16.

A circular crimped collar 54a is fastened into the round edge or mouth 54 defined by the edges 48 and 50, as by setting down rolls which form a sealing bead 54b on collar 54a and the circular body opening. The collar 54a is shown as formed from sheet stock by overlapping edges 49 which are held together by rivets 51.

The single piece or blank 14 of sheet metal from which the body is formed is shown in FIGURE 3. The teeth 20 are formed in edge 60 having slightly concave end portions 62 with a convex central portion 64 This edge appears on the lower body portion 16 which comprises extending arms 66 each having an end 53 having a straight portion 68 substantially perpendicular to the edge 60 and a concavely notched edge or corner 70. The latter terminates in a straight edge 72 more or less parallel with the corresponding portion of the edge 60. Notches 74 at the joint between the portion 16 and an extension 76 from which the upper body 32 is formed, produce the flaps 33. The extension 76 has angularly disposed straight sides 36 outwardly diverging and terminating in an outer edge 80 having straight extreme end portions 82 joined by a convexly curved central portion 84.

The manner of forming the blank of FIGURE 3 to the configuration of the body of the takeoff shown in the other figures of the drawing will be fairly evident from what has already been set forth, but the general principle of the construction permitting adaptation of the invention to a large variety of forms will best be understood from further discussion of the basic principles of the construction.

It will be observed that the lower portion 16, formed from the corresponding portion of the blank 14 constitutes in essence a substantially tubular conduit formed from the flat sheet by joining of the end portions or tabs 53 in a manner more or less analogous to the forming of an ordinary conduit of uniform diameter by joining of the edges thereof. However, the shaping of the mouth-forming edge 60 with the concave end portions 62 and the convex central portion 64 produces a generally tubular configuration in which the outer or mouth portion is of larger cross sectional dimension than the inner or upper portion of the conduit thus formed, the rearward portion 42 extending partially forwardly, but primarily upwardly (inwardly) from the plane circular outer or mouth portion 18. The notching or concave curvature of the edge or corner 70, which connects the laterally outer ends of the edges 72 with the inner or upper ends of the edges 68 of the tabs 53 produces a forwardly facing overall notch or shaping of the upper end of the wall of the lower portion 16 which is semicircular when viewed from the forward direction, as seen in FIGURE 2.

The upper portion 32 forms in essence a hood whose crest 44 extends partially outwardly (upwardly) but primarily forwardly, terminating at the rearward end, where it is integral with the lower portion, in a more or less linear bend (FIGURE 2), but forming at its forward end a smooth semicircle matching the semicircular notching of the lower portion to form an overall circular planar outlet in a plane essentially perpendicular to the plane of the inlet or mouth 18. It will be observed that this construction requires "head room" above a plenum to which the takeoff is connected of only the very small region represented by the height of the tabs 53, which is only slightly more than the height of the seating bead 22, thus permitting the connection of a round branch line to the collar 49 almost in direct contact with the top of the plenum duct.

It will be observed on study that the bottom portion 16, although generally tubular, is not round in cross-section except at the mouth 18. In order to obtain the essentially planar configuration of the semicircular lower portion of the circular outlet, and also to produce the engagement of the depending flaps 33 on the upper or hood portion with the sides of the bottom portion, the front of the latter is substantially flat in the upper region, the lower portion 16 being easily shaped by the person making the welds with a transition from the round condition at the lower end or mouth to the flat front in the upper region. Similarly, it will be obvious that there is a transition of the shape of the upper or hood portion 32 from the slight transverse linear bend or knee at 34, where the hood is flat, to the forward end, where it is semicircular.

The essential theory or design of the device may be best understood by observing that the lower portion 16 is a generally tubular conduit with the forward wall notched at its upper end to form a substantially semicircular opening in the forward direction. In the present embodiment the convex shape of the central portion of the edge 60 has the general effect of tipping the rear of the cylinder forward with respect to the round base portion when this portion of the blank is brought to tubular shape by joining the tabs 53, also producing a slight upward taper of the cross-sectional area of the conduit. The hood portion has its outer edge portions 82 radially spaced from the inner ends of the laterally extending edges 72 of the lower or inlet portion 16 of the blank by a distance corresponding to the length of the edge 72, with the convex central portion 84 shaped to lie in a plane with the lower semicircular opening and of a length (excluding flaps 33) approximately equal to the sum of the lengths of the arcs or notches 70 in the blank, thus completing the circular opening the straight portions 82 at the extreme ends forming the forward ends of the flaps 33. (Note that the curvature of the portion 84 becomes gradual near the end portions 82.) The overall sum of these lengths is less than that of the edge 60, so that the mouth is larger than the outlet opening. The length of the edges 68 is of course much smaller than the size of this opening, to make the clearance or headroom the minimum required for proper shaping.

The seam or bend 34 which forms the joint between the upper rear wall of the bottom portion 16 and the hood is opposite the central region of the circular outlet opening, being slightly above its center in the illustrated embodiment.

The direction transition of the air flow path from the vertical round inlet to the somewhat smaller horizontal round outlet is thus completely free of sharp bends or corners or constrictions and of seams or other wall obstructions which would increase the flow resistance. The general performance as regards flow resistance and headroom space occupied approximates that obtainable from rectangular-to-round takeoffs, which are of much greater cost and complexity both in fabrication and installation, while the cost of fabrication of the illustrated device is substantially less than the round-to-round elbow takeoffs heretofore known capable of comparably high performance and comparable low occupation of headroom space.

The blank 14 is of course formed by conventional stack-sawing or stamping, and the welds are then made and the collar installed, these few simple operations completing the assembly.

The blank shown in FIGURE 3 is that used for a commercial "7 x 6" round-to-round takeoff (i.e., fitting a 7-inch hole in a duct and connecting to a 6-inch branch line pipe) or, by mere scaling, any other sizes of the same ratio, as illustrated in the assembled views. The illustrated construction and dimensioning will readily be altered for other inlet and outlet sizes. Further, study will show that the more general principles of the construction may readily be adapted to fittings of different, but analogous, purpose.

Accordingly, the invention should not be considered to be limited to the particular embodiment illustrated, and the patent protection to be afforded it shall extend to all constructions described in the appended claims, and equivalents thereof.

What is claimed is:

1. A sheet-metal elbow fitting comprising
    (a) a generally tubular short sheet-metal conduit formed from a unitary sheet with opposed edges joined to form a single longitudinal seam and having a wall with forward and rearward portions and an outer end having a round mouth adapted to be connected to a duct,
    (b) the inner end of the wall of the conduit having the forward portion thereof notched to form a substantially semicircular opening facing in the forward direction and having the rearward portion thereof rearwardly opposite the opening, (c) a hood portion covering the inner end of the conduit and having its rearward end integral with the rearward portion of the inner end of the conduit and having its forward end formed to substantially semicircular shape and opposed to said semicircular opening to form therewith a substantially circular opening in the forward direction, and (d) fastening means securing the sides of the hood portion to the sides of the inner end of the conduit.

2. The fitting of claim 1 having (f) the seam formed by the jointed edges extending along the forward portion of the conduit adjacent to the notch, (g) the hood portion having integral flaps overlapping and secured to the sides of the inner end of the conduit along substantially the entire length of the hood portion.

3. The fitting of claim 2 having (h) integrally formed coupling means on the mouth for connection thereof to a flat-sided duct, and (j) a coupling collar inserted in the forwardly facing circular opening and sealed to the periphery thereof.

4. The fitting of claim 1 having (e) the notched portion of the conduit flattened, said circular opening formed by the opposed semicircular openings being in a plane substantially perpendicular to the plane of the mouth.

5. The fitting of claim 4 having (f) toothed coupling means integrally formed on the mouth and (g) a coupling collar sealed to the circular opening.

6. A sheet-metal elbow fitting comprising (a) a generally tubular short sheet-metal conduit formed from a unitary sheet with opposed edges joined to form a single longitudinal seam and having a wall with forward and rearward portions and an inner and outer end, said outer end having a plane circular mouth adapted to be connected to a duct, (b) the rearward portion of the wall extending partially forwardly but predominantly inwardly from the mouth, (c) the cross-sectional area encompassed by the wall of the conduit diminishing with distance from the mouth, (d) the inner end of the conduit having the forward portion thereof notched to form a substantially semicircular opening in the forward direction, (e) a crested hood portion covering the inner end of the conduit and having its rearward end integral with only the rearward portion of the inner end of the conduit, (f) the crest of the hood portion extending partially outwardly from said inner end but predominantly forwardly, and the forward end of the hood portion being of substantially semicircular shape and opposed to said semicircular opening to form therewith a substantially circular opening, the edges defining said opening lying in a plane at least approximately perpendicular to the circular plane of the mouth, and (g) fastening means securing the sides of the hood portion to the sides of the inner end of the conduit.

7. The fitting of claim 6 having (h) a transverse linear bend at the integral joint between the hood and the conduit, (j) the hood being flat in the region of the bend and substantially semicircular at the forward end.

8. The fitting of claim 6 wherein the fastening means comprises flaps integral with the hood and exteriorly overlapping the upper end of the sides of the conduit.

9. A unitary sheet-metal blank for the formation of an elbow fitting having a conduit-forming portion and a hood-forming portion, (a) the conduit-forming portion comprising a mouth-forming outer edge extending generally transversely of the blank and symmetrically with respect to the center portion thereof, inner edges opposed to, and generally parallel with, opposite intermediate lateral portions of the outer edge, inwardly extending end edges at the lateral ends of the outer edge, and concave curved edges joining the inner ends of the end edges to the laterally outer ends of the inner edges to form end-tab portions adapted to be joined to form a generally tubular conduit having a mouth on the outer end and having a concave notch in the general form of a semicircle in the wall thereof adjacent to the joint of the tabs, and (b) the hood-forming portion being integral with the conduit-forming portion between the laterally inner ends of said inner edges thereof, and having respective lateral edges extending radially from said laterally inner ends of the inner edges of the conduit-forming portion a distance equal to the length of said inner edges, and having an outer edge on the side opposite the outer edge of the conduit-forming portion of a length approximately equal to the total length of the concave curved edges of the conduit portion, the hood portion thus being adapted to cover the end of the conduit and form a round opening with the semicircular notch.

10. The sheet-metal blank of claim 9 having (c) the mouth-forming portion having teeth adapted for coupling to a duct.

11. The sheet-metal blank of claim 9 having (c) the mouth-forming outer edge being convexly curved at the central portion thereof and concavely curved at the outer portions thereof.

12. The sheet-metal blank of claim 9 having (c) flaps extending from the sides of the hood portion adapted to be secured to the laterally extending inner edges of the conduit portion.

13. The sheet-metal blank of claim 9 having (c) the length of the mouth-forming edge being greater than the sum of the lengths of the concave curved edges of the conduit portion and the length of the outer edge of the hood portion, so that the mouth is larger than the round opening in the assembled condition.

14. The sheet-metal blank of claim 9 having (c) the length of the inwardly extending end edges on the conduit portion being small compared to the concave curved edges, so that the headroom clearance between the mouth and the round opening is a minimum.

References Cited by the Examiner

UNITED STATES PATENTS

| 296,786 | 4/1884 | Rock | 285—183 |
| 2,131,804 | 10/1938 | Holub | 285—183 X |
| 2,963,783 | 12/1960 | Field | 285—183 X |
| 3,185,506 | 5/1965 | Szlashta | 285—424 X |

FOREIGN PATENTS 187,486 10/1956 Austria.

CARL W. TOMLIN, *Primary Examiner.*

T. A. LISLE, *Assistant Examiner.*